UNITED STATES PATENT OFFICE.

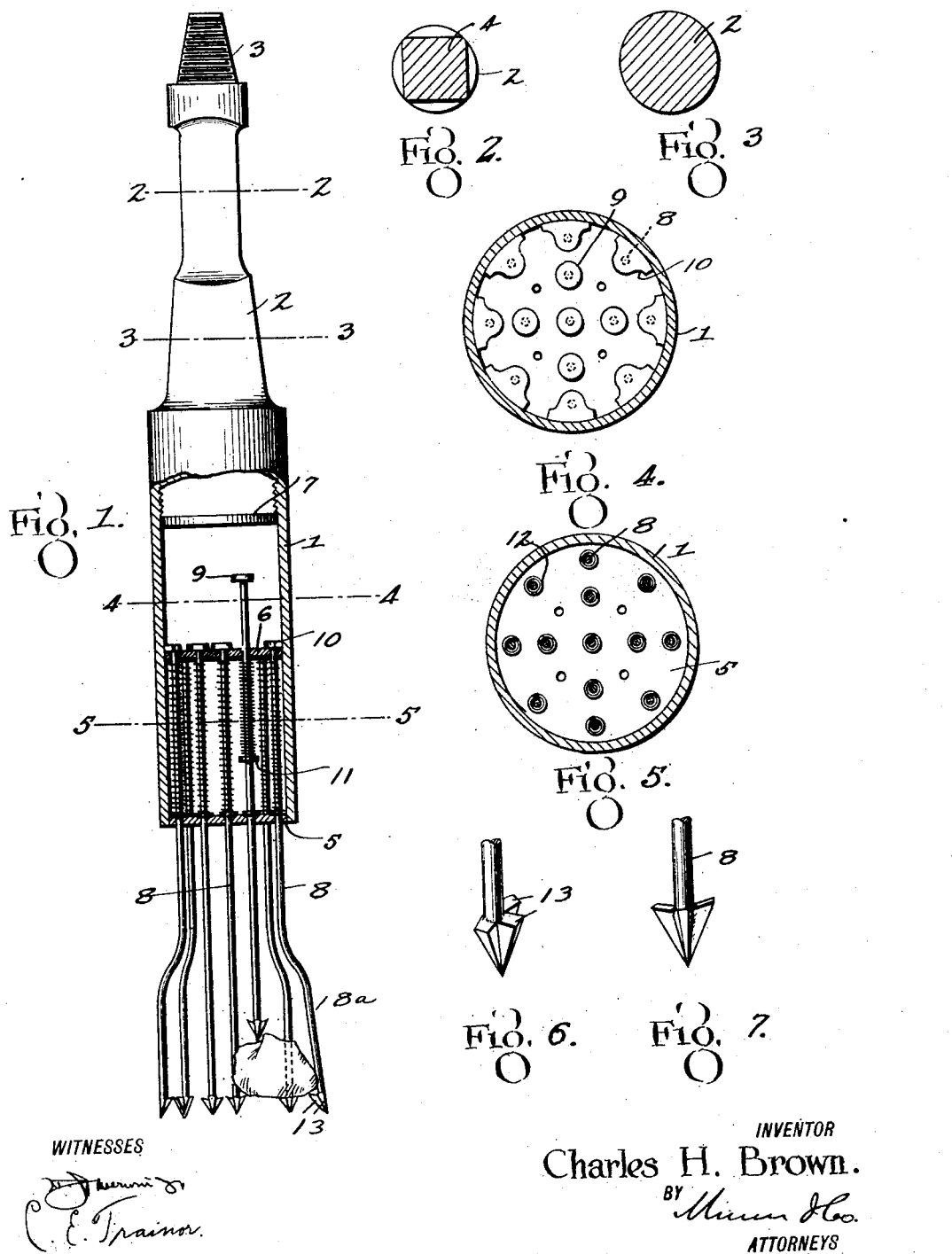

CHARLES HENRY BROWN, OF RANGER, TEXAS.

FISHING-TOOL.

1,399,249.     Specification of Letters Patent.     Patented Dec. 6, 1921.

Application filed September 13, 1920. Serial No. 409,971.

*To all whom it may concern:*

Be it known that I, CHARLES HENRY BROWN, a citizen of the United States, and a resident of Ranger, in the county of Eastland and State of Texas, have invented certain new and useful Improvements in Fishing-Tools, of which the following is a specification.

My invention is an improvement in fishing tools, and has for its object to provide a tool of the character specified, for finding and removing undesirable objects from wells, as for instance broken bits, pieces of stone, tools and the like, wherein a body is provided having a series of barbed holding rods normally extending below the body and resiliently supported to permit them to yield when directly engaging the article being fished for, and arranged to engage about the article to support the same during removal.

In the drawings,

Figure 1 is a side view of the improved tool with a part in section,

Figs. 2, 3, 4 and 5 are sections on the lines 2—2, 3—3, 4—4 and 5—5 respectively, of Fig. 1, Figs. 6 and 7 are perspective views of the lower end of one of the barbed rods.

In the present embodiment of the invention a hollow body 1 is provided, having at its upper end a shank 2 which is provided at the end remote from the body with a tapering threaded stem 3 for connection with the drilling jars or cable for raising and lowering the tool. At that end of the shank adjacent to the stem there is provided a polygonal portion 4 for engagement by a wrench or the like to attach or remove the tool.

The lower end of the body 1 is closed by a partition 5, which may be connected with the body in any suitable manner, as for instance by threading or the like. Other partitions 6 and 7 are arranged within the body, the partition 7 being near the upper end of the cavity of the body, while the partition 6 is intermediate the ends of the cavity, and a series of rods 8 is mounted to slide vertically in the partitions 5 and 6.

Each of these rods as shown is provided at its upper end with a head 9 or 10, the rods which are at the peripheral edge of the partition 6 having the heads 10, while those rods which are spaced inwardly from the peripheral edge have the heads 9. Each of these rods as shown is provided with a stop 11, in the form of a fixed collar, and these stops are so spaced from the heads 9 and 10, that when the stops are in engagement with the partition 5, the heads 9—10 of the rods will be in engagement with the partition 6. A coil spring 12 encircles each rod between the stop and the partition 6, the said springs acting normally to force the rods downward, and to hold them with the heads 9—10 in engagement with the partition 6.

Each rod 8 as shown more particularly in Figs. 6 and 7 is barbed at its lower end, the barb in the present instance being a three fold arrangement. At the lower end of these rods there is provided three wings or lugs, the said lugs being triangular. These wings extend at angles of approximately 90° with respect to each other, and they are arranged to permit them to slip past an object while moving downward, and to cause them to engage the object when moving upward.

The tool shown is especially adapted for fishing for tools, drill stems, under reamer lugs and the like, that is for engaging outside of an object, and because of the fact that the tool is designed to engage outside of an object the barbs face inward. In order to permit the tool to grasp a large object, the lower ends of those rods which are adjacent to the peripheries of the partitions 5 and 6 are offset outwardly as shown, and they are held in this position, that is they are prevented from turning by the shape of the heads 10. These heads move in contact with the internal surface of body 1, and the rods cannot turn because of this.

Referring to Fig. 4 it will be seen that the heads 10 are shaped to fit closely against the inner face of the body 1 and to prevent the rods from turning when they are moved vertically. It will be obvious that the arrangement of the rods 8 and 8—8$^a$ will depend upon the article being fished for. If for instance a hollow body is being fished for, as for instance a piece of pipe, bailer or the like, the barbs of the rods will face outward, and the rods will engage within the article instead of outside the same. The rods 8 and 8—8$^a$ are of resilient material, and in fishing for light objects, the tool might be constructed with the rods not movable vertically, their own resiliency being depended upon to permit them to conform to an article without damage. The cross section of the rods 8, 8—8ª, will depend upon the use for which the tool is intended. A tool intended for use in fishing for light objects will have rods of smaller cross sections than a tool designed for fishing for heavy objects.

In operation, the improved tool is lowered into the well, and when the article being fished for is engaged, those rods which engage the article directly will yield upward, the remaining rods will pass downwardly by the object, and the barbs will engage below the same, or within the material of the same, so that when the tool is lifted the article will be lifted with it. The number of rods used and their arrangement will depend upon the use for which the tool is intended. The partition 7 limits the upward movement of the rods.

I claim:

1. A fishing tool comprising a body, and a plurality of independently movable rods carried thereby and having gripping means.

2. A fishing tool comprising a body, a plurality of independently movable rods carried thereby and having gripping means, and springs separately urging said rods to their advanced positions.

3. A fishing tool comprising a body, a plurality of independently movable rods carried thereby and having gripping means, and means to limit the sliding movement of said rods.

4. A fishing tool comprising a body, a plurality of independently movable rods carried thereby and having gripping means, and springs separately urging said rods to their advanced positions, and means to limit the endwise movement of said rods.

5. A fishing tool comprising a body, a plurality of independently movable rods carried thereby and having gripping means, means to limit the sliding movement of said rods, and partition walls carried by said body and slidably receiving said rods, said partitions constituting a guiding means for the rods and a means for limiting the endwise movement of the same.

6. A fishing tool comprising a hollow body, having spaced partitions, rods having their rear end portions slidable through certain of said partitions and guided thereby, springs mounted on said rods and separately and independently urging the rods to their advanced positions, one of said partitions being arranged in the path of travel of the rear ends of said rods whereby to limit the rearward movement of said rods, and attaching means carried by said body.

7. A fishing tool comprising a hollow body, having spaced partitions, rods having their rear end portions slidable through certain of said partitions and guided thereby, springs mounted on said rods and separately and independently urging the rods to their advanced positions, one of said partitions being arranged in the path of travel of the rear ends of said rods whereby to limit the rearward movement of said rods, and attaching means carried by said body, the forward portions of said rods being formed with gripping means.

8. A fishing tool comprising a hollow body, having spaced partitions, rods having their rear end portions slidable through certain of said partitions and guided thereby, springs mounted on said rods and separately and independently urging the rods to their advanced positions, one of said partitions being arranged in the path of travel of the rear ends of said rods whereby to limit the rearward movement of said rods, and attaching means carried by said body, said rods being of spring metal and having their forward portions offset.

9. A fishing tool comprising a body, a plurality of rods slidably extending into the body and having heads contacting with the inner side of the body, whereby the rods are held against rotation, and gripping members carried by the forward ends of said rods.

10. A fishing tool comprising a body, a plurality of rods slidably extending into the body and having heads contacting with the inner side of the body, whereby the rods are held against rotation, gripping members carried by the forward ends of said rods, and springs.

11. A fishing tool comprising a body of tubular formation having a plurality of spaced partitions arranged therein, rods of spring metal having their rear portions slidable through certain of said partitions and having heads contacting with the inside of said body whereby to hold the rods against rotation, the forward portions of the rods being offset and provided with inwardly directed arms adapted for gripping objects, said rods being provided with integral collars between a pair of said partitions, coiled springs confined between said collars and one of said partitions to separately and independently urge said rods to their advanced positions, said collars contacting with one of said partitions whereby to limit the endwise movement of the rods in a forward direction, one of said partitions being arranged in the path of travel of said heads to limit the rearward movement of said rods, and attaching means for said body.

CHARLES HENRY BROWN.